US006128250A

United States Patent [19]

Reid et al.

[11] Patent Number: 6,128,250

[45] Date of Patent: Oct. 3, 2000

[54] BOTTOM-DEPLOYED, UPWARD LOOKING HYDROPHONE ASSEMBLY

[75] Inventors: Robert J. Reid, Tiverton; Steven D. Jette, Exeter, both of R.I.; Mark L. Pecoraro, Zephyrhills, Fla.

[73] Assignee: The United States of America as represented by the Secretary of the Navy, Washington, D.C.

[21] Appl. No.: 09/335,821

[22] Filed: Jun. 18, 1999

[51] Int. Cl.[7] .............................. H04R 1/44; G01S 15/66

[52] U.S. Cl. ........................... 367/153; 367/188; 367/173

[58] Field of Search ..................................... 367/153, 141, 367/188, 173; 181/122

[56] References Cited

U.S. PATENT DOCUMENTS

| | | | |
|---|---|---|---|
| 3,980,985 | 9/1976 | Dale et al. | 367/173 |
| 4,007,436 | 2/1977 | McMahon | 367/173 |
| 4,349,897 | 9/1982 | Boehme et al. | 367/98 |
| 5,920,524 | 7/1999 | Stein et al. | 367/188 |

*Primary Examiner*—Ian J. Lobo
*Attorney, Agent, or Firm*—Michael J. McGowan; Prithvi C. Lall; Michael F. Oglo

[57] ABSTRACT

A hydrophone assembly for deployment on the bottom of a body of water is provided wherein a plurality of hydrophones are mounted in a spaced apart relationship about the circumference of a housing which is designed to hold signal processing electronics. Each hydrophone is constructed to detect a range of frequencies within a defined receive angle that extends outward from the circumference of the housing. A resonance absorbing material is interposed between the housing and the hydrophones to isolate each hydrophone from mechanical resonance. Tilt switches are connected to each hydrophone for automatically and independently selecting hydrophones to participate in the output of the hydrophone assembly based on the orientation of the hydrophones. Selected adjacent hydrophones define a continuous receive angle formed by combining the receive angle associated with each adjacent hydrophone. The continuous receive angle faces upward from the bottom of the water to include an angular portion of the surface.

24 Claims, 2 Drawing Sheets

BOTTOM-DEPLOYED, UPWARD LOOKING HYDROPHONE ASSEMBLY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention relates generally to hydrophone assemblies, and more particularly to a hydrophone assembly that is to be deployed on the bottom of a body of water for reception of underwater acoustic signals.

(2) Description of the Prior Art

Tracking surface ship and underwater vehicles with hydrophone systems is known in the art. For a complete view of cooperative and uncooperative targets in a given area, such hydrophone tracking systems are typically deployed on the bottom of the particular body of water. To track various types of vehicles, it is desirable for the hydrophone to have as broad a receiving bandwidth as possible. Further, it is desirable that the hydrophone system operate independent of its orientation on the bottom of the water. To be useful in a variety of application scenarios, the system should be portable in nature and should be easy to place on and retrieve from the bottom of the water, i.e., it should not require a specially designed deployment vehicle or deep-water diving personnel. Ideally, each hydrophone of the hydrophone system would also be modular in nature to contain its own signal processing electronics. This would allow the hydrophone system to be custom designed with as many and/or as few hydrophones depending on the requirements of the application.

Previous bottom-deployed tracking systems are deficient in one or more of the above described design criteria. Prior art hydrophones have avoided integrating the signal processing electronics with the hydrophone owing to mechanical resonant interference from the signal processing housing. Finally, the prior art tracking systems are not designed for repeated installations and therefore are not portable.

SUMMARY OF THE INVENTION

Accordingly, it is an object of the present invention to provide a hydrophone assembly suitable for deployment on the bottom of a body of water.

Another object of the present invention is to provide a bottom-deployed hydrophone assembly having a broad operating bandwidth.

Still another object of the present invention is to provide a hydrophone assembly that can integrate signal processing electronics with the hydrophone elements.

Yet another object of the present invention is to provide a bottom-deployed hydrophone assembly whose operation is independent of the orientation of the hydrophone assembly on the bottom of a body of water.

Other objects and advantages of the present invention will become more obvious hereinafter in the specification and drawings.

In accordance with the present invention, a hydrophone assembly for deployment on the bottom surface of a body of water is provided. A hollow, cylindrical steel housing, designed to hold signal processing electronics, has a central longitudinal axis that lies substantially parallel to the bottom of the water. A plurality of hydrophones are mounted in a spaced apart relationship about the circumference of the housing. Each of the hydrophones is constructed to detect a range of frequencies within a defined receive angle that extends outward from the circumference of the housing. A resonance absorbing material is interposed between the housing and the hydrophones to isolate each hydrophone from mechanical resonance of the housing. Tilt switches are connected to each hydrophone for automatically and independently selecting adjacent hydrophones to participate in the output of the hydrophone assembly based on the orientation of each of the hydrophones. The adjacent hydrophones define a continuous receive angle associated with each adjacent hydrophone. The continuous receive angle faces upward from the bottom of the water to include an angular portion of the surface. The size of the angular portion is dependent upon the overall requirements of the hydrophone assembly.

BRIEF DESCRIPTION OF THE DRAWINGS

Other objects, features and advantages of the present invention will become apparent upon reference to the following description of the preferred embodiments and to the drawings, wherein.

DESCRIPTION OF THE PREFERRED EMBODIMENTS

Figure 1:
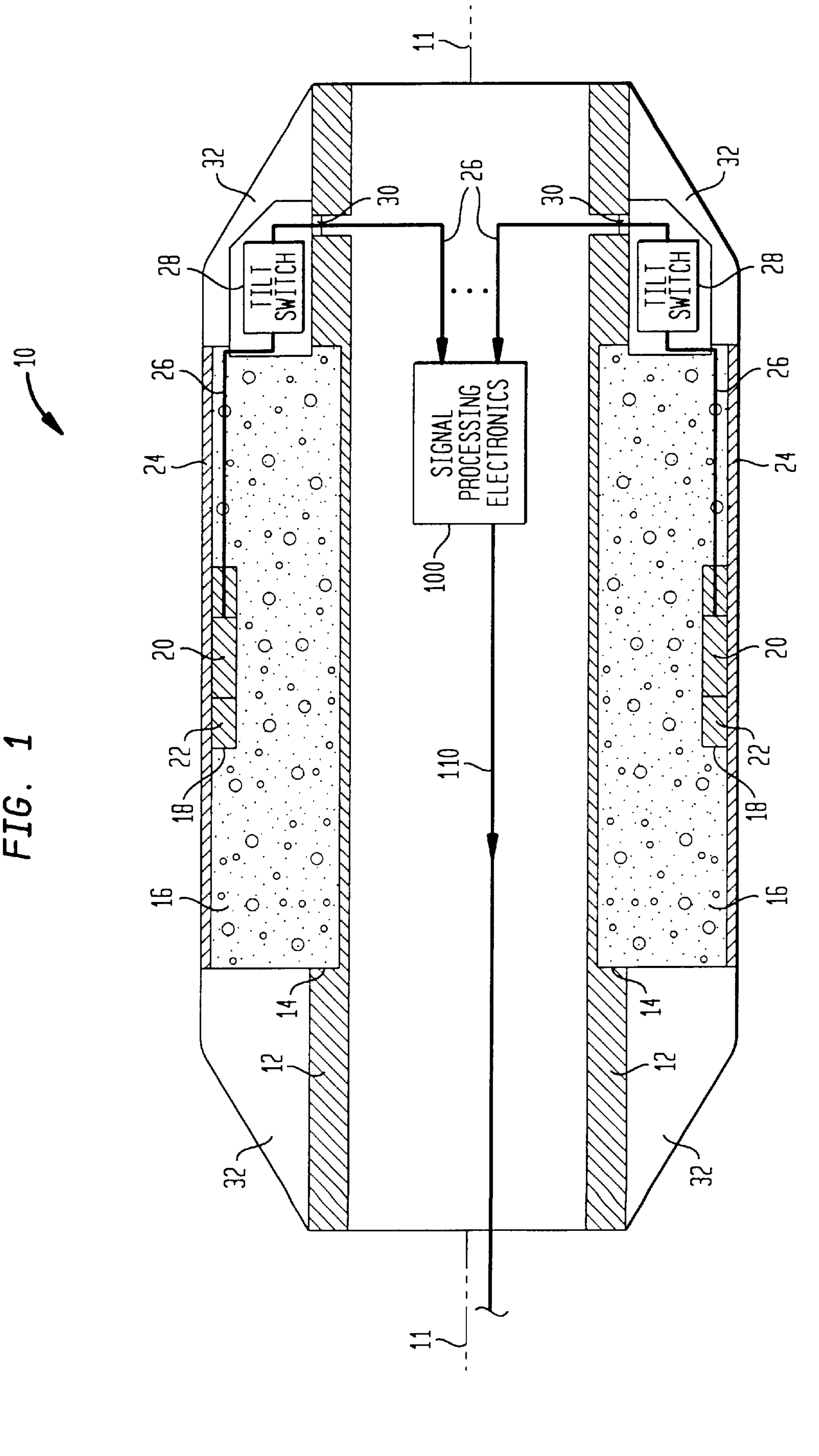
FIG. 1 is a cross-sectional view of a preferred embodiment bottom-deployed, upward looking hydrophone assembly according to the present invention.

Referring now to the drawings, and more particularly to FIG. 1, a cross-sectional view is shown of the hydrophone assembly, referenced generally by numeral 10, according to a preferred embodiment of the present invention. By way of example, hydrophone assembly 10 will be described relative to its role in the U.S. Navy's Portable Tracking System (PTS). In this role, hydrophone assembly 10 is part of an in-line multiplexed bottom-deployed sensor system. This system must detect acoustic signals within an angular sweep of at least 120° looking upwards from the system towards the surface of the water. The system must be acoustically sensitive in the 8 kHz–40 kHz frequency range while deployed in water depths up to 600 meters. However, as will be readily apparent to one skilled in the art, the novel, features of the present invention apply equally as well to other hydrophone assemblies that are part of sensor systems having different system requirements.

In FIG. 1, hydrophone assembly 10 integrates the hydrophone element(s) and signal processing electronics by means of a single structure. Hollow cylindrical steel housing 12 forms the protective housing for signal processing electronics 100 that processes signals received by hydrophone assembly 10. Electronics 100 can comprise any standard signal processing equipment associated with hydrophones that is well known in the art (e.g., preamplifier, filters, multiplexer, processor, optical electronics, etc.). Thus, it is to be understood that electronics 100 is not a part of the present invention. The output of electronics 100 is typically output on line 110 which can be electrical lead or optical fiber. Alternatively, the output from electronics 100 can be a "wireless" transmission. Accordingly, it is to be further understood that the method and/or apparatus used to transmit the output from electronics 100 is not a part of the present invention.

Housing 12 also forms the structural building block for hydrophone assembly 10. Specifically, housing 12 is provided with cylindrical recess 14 receiving resonance absorbing material therein. Cylindrical recess 18 is provided in resonance absorbing material 16 for receiving a plurality (of which two appear in FIG. 1) of hydrophones 20 spaced apart from one another within cylindrical recess 18 about the periphery of hydrophone assembly 10. Hydrophones 20 are potted in place with an acoustically transparent polyurethane 22. The outer surface of hydrophone assembly 10 formed by resonance absorbing material 16, polyurethane 22 and hydrophones 20 is then covered with neoprene rubber skin 24 as a final sealant/protector. The output from each of hydrophones 20 is transmitted on a corresponding signal cable 26 to signal processing electronics 100. Electrical conductivity between each hydrophone 20 and electronics 100 along a corresponding one of signal cables 26 is dependent upon the electrical conductivity of a corresponding tilt switch 28. In other words, tilt switch 28 controls whether or not the output from the respective hydrophone 20 will be passed to electronics 100. Signal cables 26 pass through to housing 12 by means of hermetic seal 30. Finally, depending on the thickness of resonance absorbing material 16 and tilt switches 28, transition pieces 32 at either end thereof can be used to streamline the profile of hydrophone assembly 10.

Figure 2:
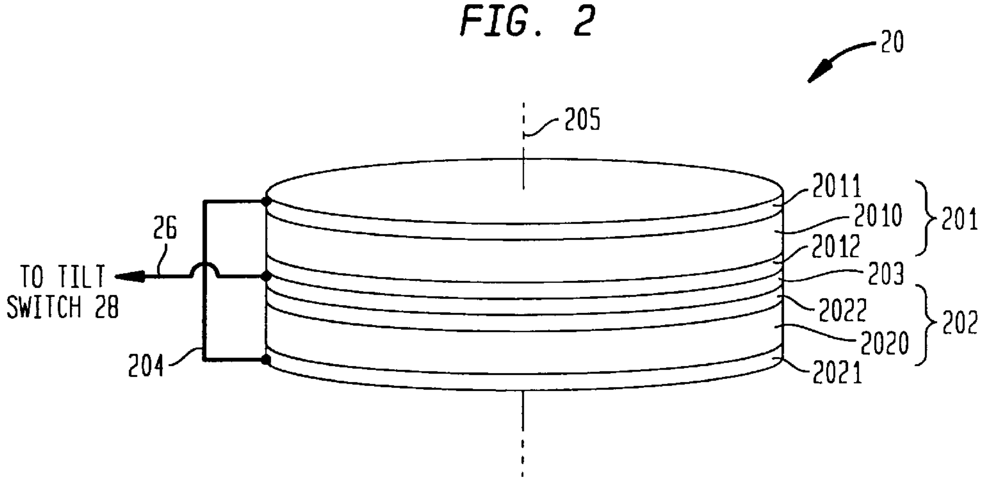
FIG. 2 is a perspective view of the hydrophone element used in the preferred embodiment of the present invention.

In order to provide the broad bandwidth capability required for the illustrative example, each of hydrophones 20 is constructed as shown in the perspective view of FIG. 2. Hydrophone 20 is a laminated structure formed by two piezoelectric elements 201 and 202 sandwiched about a common electrode 203 that is connected to signal cable 26. Each of elements 201 and 202 respectively includes piezoelectric material 2010 and 2020 sandwiched respectively by electrodes 2011/2012 and 2021/2022. Electrodes 2011 and 2021 are electrically connected to one another via line 204. Each of elements 201 and 202 are circular in shape to provide a uniform beam pattern in all receiving directions about main response axis 205 which is normal to the surface of hydrophone 20. A variety of piezoelectric materials can be selected for piezoelectric material 2010 and 2020. However, for the bandwidth contraints imposed by the illustrative example, each piezoelectric material 2010 and 2020 is a flexible piezoelectric composite material such as lead titanate particles embedded in a neoprene rubber matrix. This material is known in the art as PZR ("piezorubber"). This composite material provide good sensitivity while its flexible nature permits the use of simple fabrication processes.

As mentioned above, it is desirable to provide a compact design that integrates the hydrophone element(s) and the hydrophone's signal processing electronics. This eliminates the need for underwater cables or connectors and therefore increases the overall reliability of the hydrophone assembly. However, the rigid (steel) housing 12 mechanically resonates at its natural frequency (and harmonics thereof) and is therefore a source of acoustic interference if housing 12 is in acoustic contact with hydrophones 20. (The particular resonance frequency is inherent to the physical dimensions of housing 12.) One solution is to vary the dimensions of housing 12 so that the resonances are shifted in frequency away from the receiving bandwidth of interest, i.e., outside the 8 kHz–40 kHz listening range for the illustrative example. However, as bandwidth requirements increase, such resonance shifting can complicate the overall design of housing 12. Thus, the present invention isolates each of hydrophones 20 from the mechanical resonances of housing 12 by means of resonance absorbing material 16. In terms of the illustrative example, resonance absorbing material 16 is a material having particles of lead embedded in a syntactic foam made from silicon rubber.

Since hydrophone assembly 10 is to be deployed on the bottom of a body of water for monitoring ship and underwater traffic, hydrophone assembly 10 need only have a maximum acoustic beamwidth of 180° that runs parallel with the surface of the water. Practically speaking, and in terms of the illustrative example, an acoustic beamwidth on the order of 120° (looking upward towards the water's surface) is sufficient to monitor ships and underwater vehicles over a board area of the water's surface. Thus, hydrophone assembly 10 need only be acoustically active over a relatively small angle that faces substantially upward from the bottom of the water. Unfortunately, if hydrophone assembly 10 were designed to receive only over the specified angle, placement of hydrophone assembly would require special positioning equipment/personnel thereby complicating the assembly's deployment and minimizing its value as a repeated-use hydrophone assembly.

One solution to the problem of requiring specialized positioning equipment/personnel is to make the deployed hydrophone assembly acoustically active over 360° by using either an acoustic ring hydrophone or a plurality of hydrophones spaced around the periphery of the hydrophone assembly. However, each of these options generates distortion due to diffraction as acoustic signals reflect from the bottom surface of the water.

The present invention solves the problem of distortion due to diffraction by incorporating tilt switches 28 to govern the conductivity along each of signal cables 26. Each of tilt switches 28 is configured such that only those of hydrophones 20 necessary to provide the required (receiving) acoustic beamwidth are activated once hydrophone assembly 10 is deployed on the bottom of the water. In terms of the illustrative example, each of tilt switches 28 is conductive only within ±22.5° of a line normal to the water's surface. Thus, tilt switches 28 allow the passage of signals (received by the correspondingly connected hydrophone 20) to electronics 100 based on the orientation of the correspondingly connected hydrophone 20. Each of tilt switches 28 can be implemented by any one of a variety of well known mechanical, mercury, etc., tilt switches.

Figure 3:
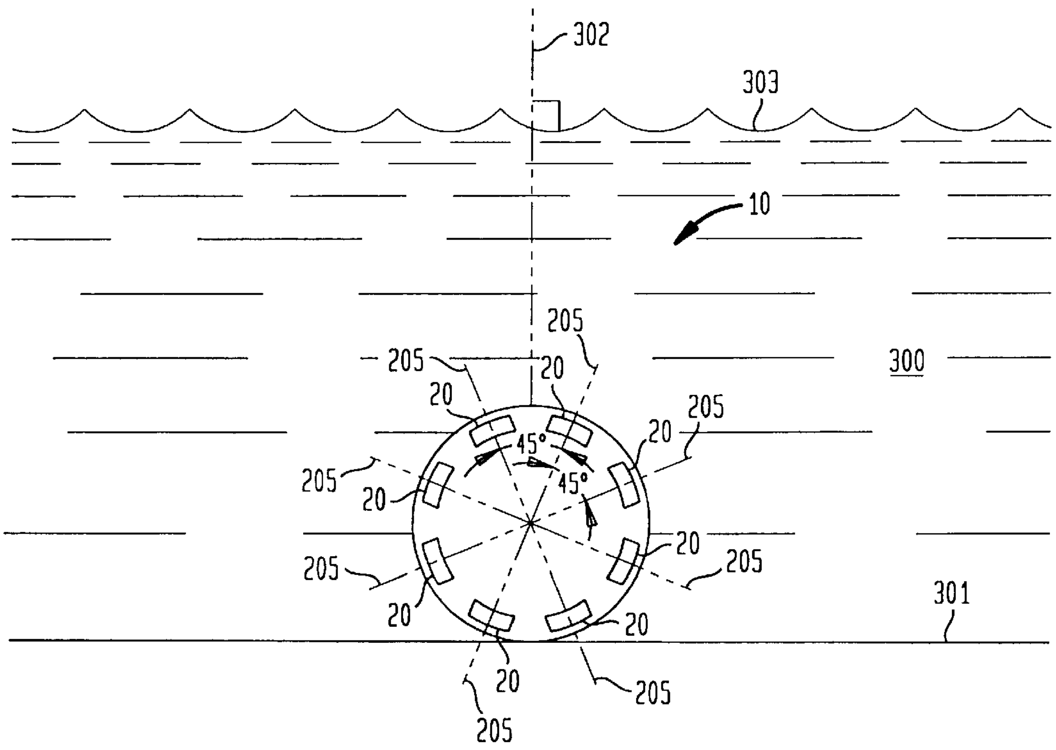
FIG. 3 is a diagrammatic representation of an end view of the preferred embodiment as it is deployed on the bottom of a body of water such that two of its hydrophone elements are activated.

The advantages afforded by the use of tilt switches 28 is best understood by describing the operation of the present invention as it pertains to the illustrative example. In FIG. 3, hydrophone assembly 10 is shown diagrammatically from one end thereof as it is deployed on bottom 301 of body of water 300. Once deployed, the longitudinal axis 11 of hydrophone assembly 10 is parallel with bottom 301. For purpose of the illustrative example, eight hydrophones 20 are equally spaced (i.e., main response axes 205 are spaced apart from one another by 45°) about the periphery of hydrophone assembly 10. If each of hydrophones is constructed as described above with reference to FIG. 2, each of hydrophones 20 has an individual acoustic beamwidth of approximately 120° balanced symmetrically about the respective main response axis 205. Accordingly, no more than two adjacent ones of hydrophones 20 need ever be participating in the output of hydrophone assembly 10 to achieve an upwardly-directed acoustic beamwidth of 120–180° (balanced about line 302 normal to surface 303). Note that for the illustrative embodiment, there is a possibility that only one of hydrophones 20 need be activated. This scenario would occur only if hydrophone assembly 10 deployed itself on bottom 301 such that one main response axis 205 were perpendicular to the surface of water 300—a condition that is not likely to occur.

The advantages of the present invention are numerous. Signal processing electronics are integrated with the hydrophone element(s) thereby providing a compact modular hydrophone assembly that provides good sensitivity while minimizing distortion due to mechanical resonances of the assembly itself. Further, the present invention can be easily deployed, e.g., dropped from the water's surface, as an individual element or as part of a sensor array cable since orientation of the hydrophone assembly will automatically activate only those hydrophones needed to achieve an overall acoustic beamswidth. The automatic hydrophone activation minimizes losses due to diffraction between adjacent hydrophone elements. Finally, the structure and material used in the individual hydrophone elements provides a broad operating bandwidth not currently available.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A hydrophone assembly comprising:

a housing;

a plurality of hydrophones mounted in a spaced apart relationship about the periphery of said housing; and switching means connected to said plurality of hydrophones for limiting the number of said plurality of hydrophones participating in the output of said hydrophone assembly based on the orientation of each of said plurality of hydrophones.

2. A hydrophone assembly as in claim 1 wherein said housing includes:

a rigid body; and material interposed between said rigid body and said plurality of hydrophones, said material isolating each of said plurality of hydrophones from mechanical resonance of said rigid body.

3. A hydrophone assembly as in claim 1 wherein each of said plurality of hydrophones comprises:

a first element defined by a first piece of piezoelectric material sandwiched between a first electrode and a second electrode;

a second element defined by a second piece of piezoelectric material sandwiched between a first electrode and a second electrode, said first electrode of said first piece of piezoelectric material being electrically connected with said first electrode of said second piece of piezoelectric material; and a common electrode sandwiched between and in electrical contact with said second electrode of said first element and said second electrode of said second element.

4. A hydrophone assembly as in claim 3 wherein said first piece of piezoelectric material and said second piece of piezoelectric material comprise a composite of lead titanate particles embedded in a neoprene rubber matrix.

5. A hydrophone assembly as in claim 3 wherein said first element and said second element are equally sized, circularly-shaped discs.

6. A hydrophone assembly as in claim 1 wherein said switching means limits the number of said plurality of hydrophones participating in the output of said hydrophone assembly to a plurality of adjacent ones of said plurality of hydrophones, said plurality of adjacent ones defining a receiving angle of said hydrophone assembly that minimizes diffraction losses for said receiving angle.

7. A hydrophone assembly as in claim 6 wherein said hydrophone assembly is deployed on the bottom of a body of water and said receiving angle includes an angular portion of the surface of said body of water.

8. A hydrophone assembly as in claim 7 wherein said angular portion is at least 120°.

9. A hydrophone assembly as in claim 1 wherein said switching means comprises a tilt switch associated with each of said plurality of hydrophones.

10. A hydrophone assembly for deployment on the bottom of a body of water, comprising:

A cylindrical housing having a center longitudinal axis, wherein said center longitudinal axis lies substantially parallel to the bottom of said body of water;

A plurality of hydrophones mounted in a spaced apart relationship about the circumference of said cylindrical housing, wherein each of said plurality of hydrophones detects a range of frequencies within a defined receive angle that extends outward from the circumference of said cylindrical housing; and Switching means connected to each of said plurality of hydrophones for automatically and independently selecting a plurality of adjacent ones of said plurality of hydrophones to participate in the output of said hydrophone assembly based on the orientation of each of said plurality of hydrophones.

11. A hydrophone assembly as in claim 10 wherein said housing includes:

a rigid body; and material interposed between said rigid body and said plurality of hydrophones, said material isolating each of said plurality of hydrophones from mechanical resonance of said rigid body.

12. A hydrophone assembly as in claim 10 wherein each of said plurality of hydrophones comprises:

A first element defined by a first piece of piezoelectric material sandwiched between a first electrode and a second electrode;

A second element defined by a second piece of piezoelectric material sandwiched between a first electrode and a second electrode, said first electrode of said first piece of piezoelectric material being electrically connected with said first electrode of said second piece of piezoelectric material; and A common electrode sandwiched between and in electrical contact with said second electrode of said first element and said second electrode of said second element.

13. A hydrophone assembly as in claim 12 wherein said first piece of piezoelectric material and said second piece of piezoelectric material comprise a composite of lead titanate particles embedded in a neoprene rubber matrix.

14. A hydrophone assembly as in claim 12 wherein said first element and said second element are equally sized, circularly-shaped discs.

15. A hydrophone assembly as in claim 10 wherein said switching means comprises a tilt switch associated with each of said plurality of hydrophones.

16. A hydrophone assembly for deployment on the bottom of a body of water, comprising:

a hollow, cylindrical steel housing having a center longitudinal axis, wherein said center longitudinal axis lies substantially parallel to the bottom of said body of water;

a plurality of hydrophones mounted in a spaced apart relationship about the circumference of said steel housing, wherein each of said plurality of hydrophones detects a range of frequencies within a defined receive angle that extends outward from the circumference of said steel housing;

a material interposed between said steel housing and said plurality of hydrophones, said material isolating each of said plurality of hydrophones from mechanical resonance of said steel housing, and switching means connected to each of said plurality of hydrophones for automatically and independently selecting a plurality of adjacent ones of said plurality of hydrophones to participate in the output of said hydrophone assembly, said plurality of adjacent ones defining a continuous receive angle formed by combining said receive angle associated with each of said plurality of adjacent ones, said continuous receive angle facing upward from the bottom of said body of water to include an angular portion of the surface of said body of water, said angular portion being at least 120°.

17. A hydrophone assembly as in claim 16 wherein said plurality of hydrophones comprises eight hydrophones having a center-to-center spacing therebetween of 45°.

18. A hydrophone assembly as in claim 17 wherein each of said eight hydrophones comprises:

A first element defined by a first piece of piezoelectric material sandwiched between a first electrode and a second electrode;

A second element defined by a second piece of piezoelectric material sandwiched between a first electrode and a second electrode, said first electrode of said first piece of piezoelectric material being electrically connected with said first electrode of said second piece of piezoelectric material; and A common electrode sandwiched between and in electrical contact with said second electrode of said first element and said second electrode of said second element.

19. A hydrophone assembly as in claim 18 wherein said first piece of piezoelectric material and said second piece of piezoelectric material comprise a composite of lead titanate particles embedded in a neoprene rubber matrix.

20. A hydrophone assembly as in claim 19 wherein said plurality of adjacent ones is limited to two adjacent hydrophones from said eight hydrophones.

21. A hydrophone assembly as in claim 19 wherein said first element and said second element are equally sized, circularly-shaped discs.

22. A hydrophone assembly as in claim 16 wherein said material interposed between said steel housing and said plurality of hydrophones is a lead-loaded silicon rubber in a syntactic foam matrix.

23. A hydrophone assembly as in claim 16 wherein an outer wall of said steel housing is recessed to received said material and wherein said material is recessed to receive each of said plurality of hydrophones.

24. A hydrophone assembly as in claim 16 wherein said switching means comprises a tilt switch associated with each of said plurality of hydrophones.

* * * * *